(12) United States Patent
Kanaboshi et al.

(10) Patent No.: US 8,755,996 B2
(45) Date of Patent: Jun. 17, 2014

(54) VEHICULAR OPERATION ASSISTING SYSTEM

(75) Inventors: Mitsuharu Kanaboshi, Saitama (JP); Yukihiro Fujiwara, Saitama (JP); Yasushi Shoda, Saitama (JP); Yusuke Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 866 days.

(21) Appl. No.: 12/127,618

(22) Filed: May 27, 2008

(65) Prior Publication Data

US 2008/0300788 A1    Dec. 4, 2008

(30) Foreign Application Priority Data

May 28, 2007   (JP) ................................ 2007-140222

(51) Int. Cl.
*G06F 17/10*    (2006.01)

(52) U.S. Cl.
USPC ........................................................ 701/301

(58) Field of Classification Search
USPC ........................................................ 701/301
See application file for complete search history.

(56) References Cited

U.S. PATENT DOCUMENTS

| | | | | |
|---|---|---|---|---|
| 5,703,775 | A  * | 12/1997 | Yamamoto et al. | 701/41 |
| 5,854,987 | A  * | 12/1998 | Sekine et al. | 701/41 |
| 6,157,892 | A  * | 12/2000 | Hada et al. | 701/301 |
| 6,256,584 | B1 * | 7/2001 | Kodaka et al. | 701/301 |
| 6,317,693 | B2 * | 11/2001 | Kodaka et al. | 701/301 |
| 6,338,022 | B1 * | 1/2002 | Shinmura et al. | 701/301 |
| 6,571,176 | B1 * | 5/2003 | Shinmura et al. | 701/301 |
| 6,675,096 | B2 * | 1/2004 | Matsuura | 701/301 |
| 7,283,907 | B2 * | 10/2007 | Fujiwara et al. | 701/301 |
| 7,453,925 | B2 * | 11/2008 | Keegan et al. | 375/148 |
| 7,734,418 | B2 * | 6/2010 | Shoda et al. | 701/301 |
| 7,937,199 | B2 * | 5/2011 | Shoda et al. | 701/41 |
| 2002/0156580 | A1 * | 10/2002 | Matsuura | 701/301 |
| 2004/0145238 | A1 | 7/2004 | Seto et al. | |
| 2004/0236491 | A1 * | 11/2004 | Seto | 701/96 |
| 2005/0267683 | A1 * | 12/2005 | Fujiwara et al. | 701/301 |
| 2006/0158031 | A1 | 7/2006 | Kummel et al. | |

FOREIGN PATENT DOCUMENTS

| | | | | |
|---|---|---|---|---|
| EP | 1 251 060 A | 10/2002 | | |
| JP | 2000 043741 A | 2/2000 | | |
| JP | 2000072021 A | * 3/2000 | ............... | B62D 6/00 |
| JP | 3557907 B2 | 5/2004 | | |
| JP | 2005-324699 | 11/2005 | | |
| JP | 2007-008402 | 1/2007 | | |

* cited by examiner

*Primary Examiner* — Michael Fuelling
(74) *Attorney, Agent, or Firm* — Arent Fox LLP

(57) ABSTRACT

There is provided a system for immediately reflecting an intention of a driver wanting to avoid an obstacle to assistance to an avoidance operation. A vehicular operation assisting system for assisting the avoidance operation made by the driver of a vehicle in avoiding the obstacle includes an avoidance required distance calculating section for periodically calculating an avoidance required distance that is a distance required to avoid the obstacle when the obstacle is detected ahead of the vehicle, an avoidance operation determining section for periodically determining the avoidance operation with respect to the obstacle on the basis of steering maneuvers of the driver and an avoidance operation assisting degree calculating section for periodically calculating an avoidance operation assisting degree per based on the avoidance required distance calculated by the avoidance required distance calculating section and the judgment result of the avoidance operation determining section.

9 Claims, 6 Drawing Sheets

VEHICULAR OPERATION ASSISTING SYSTEM

CROSS REFERENCE TO RELATED APPLICATIONS

This application claims the foreign priority benefit under Title 35, U.S. Code, §119(a)-(d) of Japanese Patent Application No. 2007-140222, filed on May 28, 2007.

BACKGROUND OF THE INVENTION

1. Field of the Invention

The present invention relates to a vehicular operation assisting system for assisting a driver in making an avoidance operation of a vehicle to avoid an obstacle.

2. Description of Related Art

There have been disclosed technological contents utilizing a steering assistance of a power steering unit to avoid an obstacle found ahead of a vehicle in its advancing direction. For instance, JP3557907A (claim 5 and others) discloses a power steering unit for assisting a driver in steering a steering wheel by an auxiliary steering torque calculated corresponding to a degree of steering torque when the driver operates the steering wheel, wherein the power steering unit calculates a predictive advancing path of own vehicle, measures temporal changes of a transverse deviation of the predictive path with respect to an obstacle, determines that the driver intents to avoid the obstacle when the transverse deviation increases and sets a control gain that increases the auxiliary steering torque.

In order to adequately assist the operation of the steering wheel by the power steering unit, it is necessary to accurately determine that the operation of the steering wheel of the driver is made to avoid the obstacle. However, it is also necessary to immediately reflect the intention of the driver wanting to avoid the obstacle to the assistance made by the power steering unit because the avoidance of the obstacle is often required in emergency.

However, there is a case when the intention of the driver may not be immediately reflected to the assistance to the avoidance operation by the technological content disclosed in JP3557907A. JP3557907A determines that the driver intents to avoid the obstacle when the transverse deviation increases. It means that when the transverse deviation does not increase, JP3557907A determines that the driver has no intention to avoid the obstacle. Suppose now a case when the obstacle is found at position having a transverse deviation in a right direction with respect to own vehicle. When the driver rotates the steering wheel left to avoid this obstacle as shown in FIG. 5 that shows a positional relationship between own vehicle and the obstacle in the prior art assistance given to an avoidance operation, it is possible to determine that the driver intents to avoid the obstacle because the transverse deviation in the right direction increases. However, the transverse deviation decreases or barely changes when the driver rotates the steering wheel right or rotates the steering wheel again right after rotating to left as shown in FIG. 6 that shows a positional relationship between own vehicle and the obstacle in another prior art assistance given to the avoidance operation. Then, determining that the driver has no intention to avoid the obstacle, the power steering unit makes no assistance to steering of the steering wheel until when the transverse deviation increases in this state.

In view of the problem described above, there is a need for providing a system that clearly reflects the intention of the driver wanting to avoid the obstacle to the assistance to the avoidance operation.

SUMMARY OF THE INVENTION

In order to solve the aforementioned problem, preferably, there is provided a vehicular operation assisting system for assisting a driver in making an avoidance operation of a vehicle to avoid an obstacle, having an obstacle detecting section for detecting the obstacle found ahead of the vehicle, an avoidance required distance calculating section for periodically calculating an avoidance required distance that is a distance required to avoid the detected obstacle, an avoidance operation determining section for periodically determining the avoidance operation made by the driver with respect to the detected obstacle on the basis of steering operation of the driver and an avoidance operation assisting degree calculating section for periodically calculating an avoidance operation assisting degree based on the avoidance required distance calculated by the avoidance required distance calculating section and the judgment result of the avoidance operation determining section.

The invention is thus preferably configured so as to determine that the driver has an intention to avoid the obstacle from the steering operation of the driver when the obstacle is found ahead of own vehicle, so that the assistance may be given to the avoidance operation regardless of the direction of steering made by the driver whether it is right or left.

Accordingly, the invention can reflect the intention of the driver wanting to avoid the obstacle and the distance necessary for avoiding the obstacle to the degree of assistance to the avoidance operation, so that the invention can give the assistance considering a positional relationship between own vehicle and the obstacle to the avoidance operation and can give the assistance to the avoidance operation without giving no feeling of strangeness to the driver.

DETAILED DESCRIPTION OF THE INVENTION

The best mode for carrying out a vehicular operation assisting system of the invention will be explained below with reference to the appended drawings.

Figure 1:
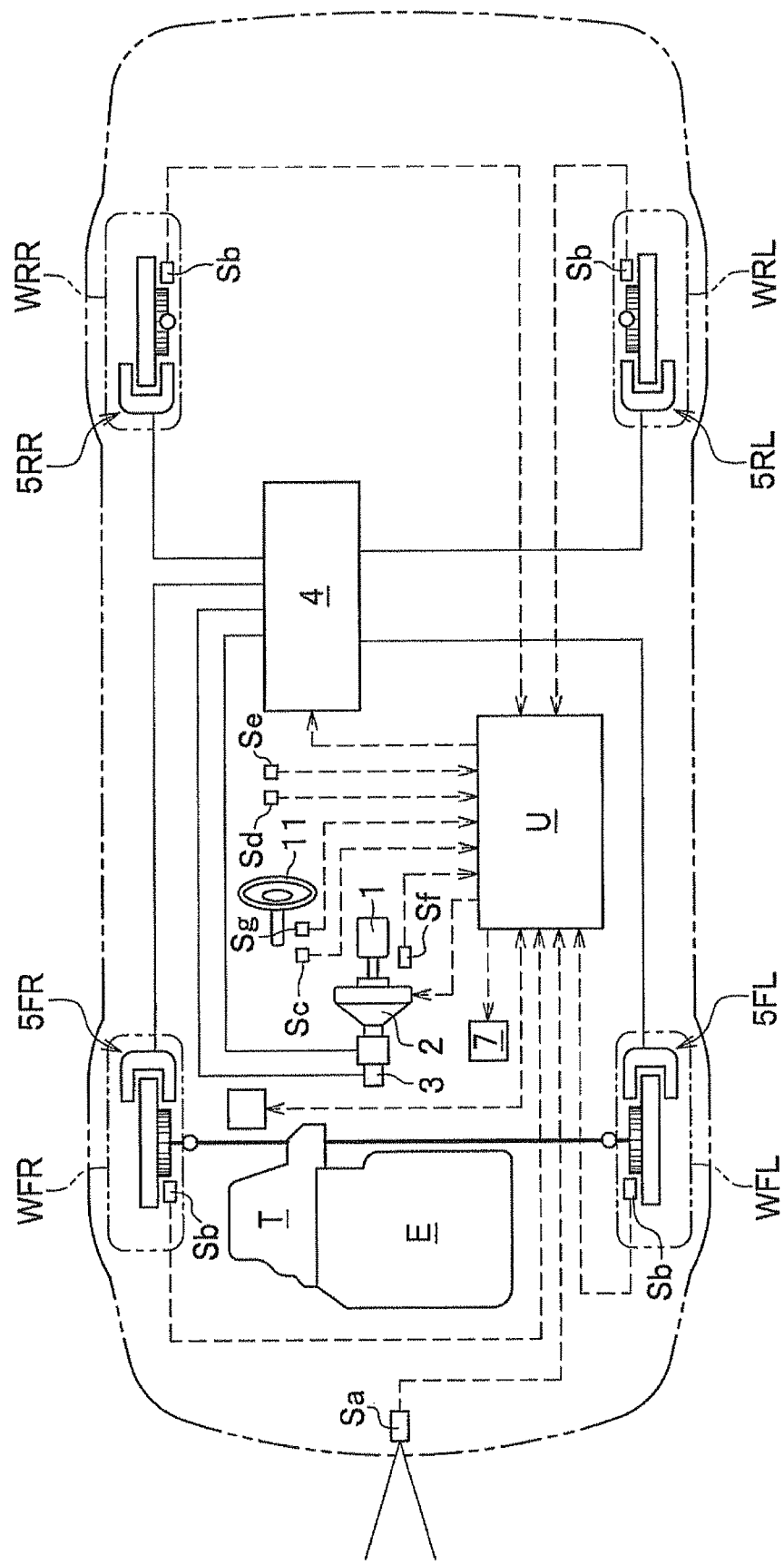
FIG. 1 is a block diagram of an overall structure of a vehicle including a vehicular operation assisting system of an embodiment of the invention.

(1) Overall Structure of Vehicle Including Vehicular Manipulation Assisting System:

FIG. 1 shows an overall structure of a vehicle including a vehicular operation assisting system of the present embodiment. As shown in FIG. 1, the four-wheel vehicle including the vehicular operation assisting system of the present embodiment has left and right front wheels WFL and WFR that are driving wheels to which driving force of an engine E is transmitted and left and right rear wheels WRL and WRR that are follower wheels and rotate along with driving of the vehicle.

A brake pedal 1 depressed by the driver is connected to a master cylinder 3 through an electronically controlled negative pressure booster 2 that composes a part of a brake system.

The electronically controlled negative pressure booster 2 operates the master cylinder 3 while mechanically boosting a tread force to the brake pedal 1 and also operates the master cylinder 3 by a brake command signal from an electronic control unit U without requiring the operation of the brake pedal 1 during an automatic brake mode. When the tread force is applied to the brake pedal 1 and the brake command signal is also inputted from the electronic control unit U, the electronically controlled negative pressure booster 2 outputs a brake hydraulic pressure by adjusting to either one larger among them. It is noted that an input rod of the electronically controlled negative pressure booster 2 is connected to the brake pedal 1 through a lost motion mechanism so that the brake pedal 1 stays at an initial position even when the electronically controlled negative pressure booster 2 operates due to the signal from the electronic control unit U and the input rod moves forward.

A pair of output ports (not shown) of the master cylinder 3 is connected to brake calipers 5FL, 5FR, 5RL and 5RR respectively provided to the front wheels WFL and WFR and the rear wheels WRL and WRR through a hydraulic control unit 4 composing a part of the brake system. The hydraulic control unit 4 is provided with four pressure regulators (not shown) corresponding to the four brake calipers 5FL, 5FR, 5RL and 5RR. The respective pressure regulators (not shown) are connected to the electronic control unit U to individually control operations of the brake calipers 5FL, 5FR, 5RL and 5RR provided to the front wheels WFL and WFR and the rear wheels WRL and WRR.

Accordingly, it is possible to arbitrarily control a yaw moment of the vehicle and to stabilize an attitude of the vehicle during a turn by differentiating braking forces of the right and left wheels by independently controlling the braking hydraulic pressures respectively transmitted to the brake calipers 5FL, 5FR, 5RL and 5RR by the pressure regulators (not shown) during the turn of the vehicle. It is also possible to perform an anti-lock brake control for suppressing locking of the wheels by independently controlling the braking hydraulic pressures transmitted to the respective brake calipers 5FL, 5FR, 5RL and 5RR during braking.

Figure 2:
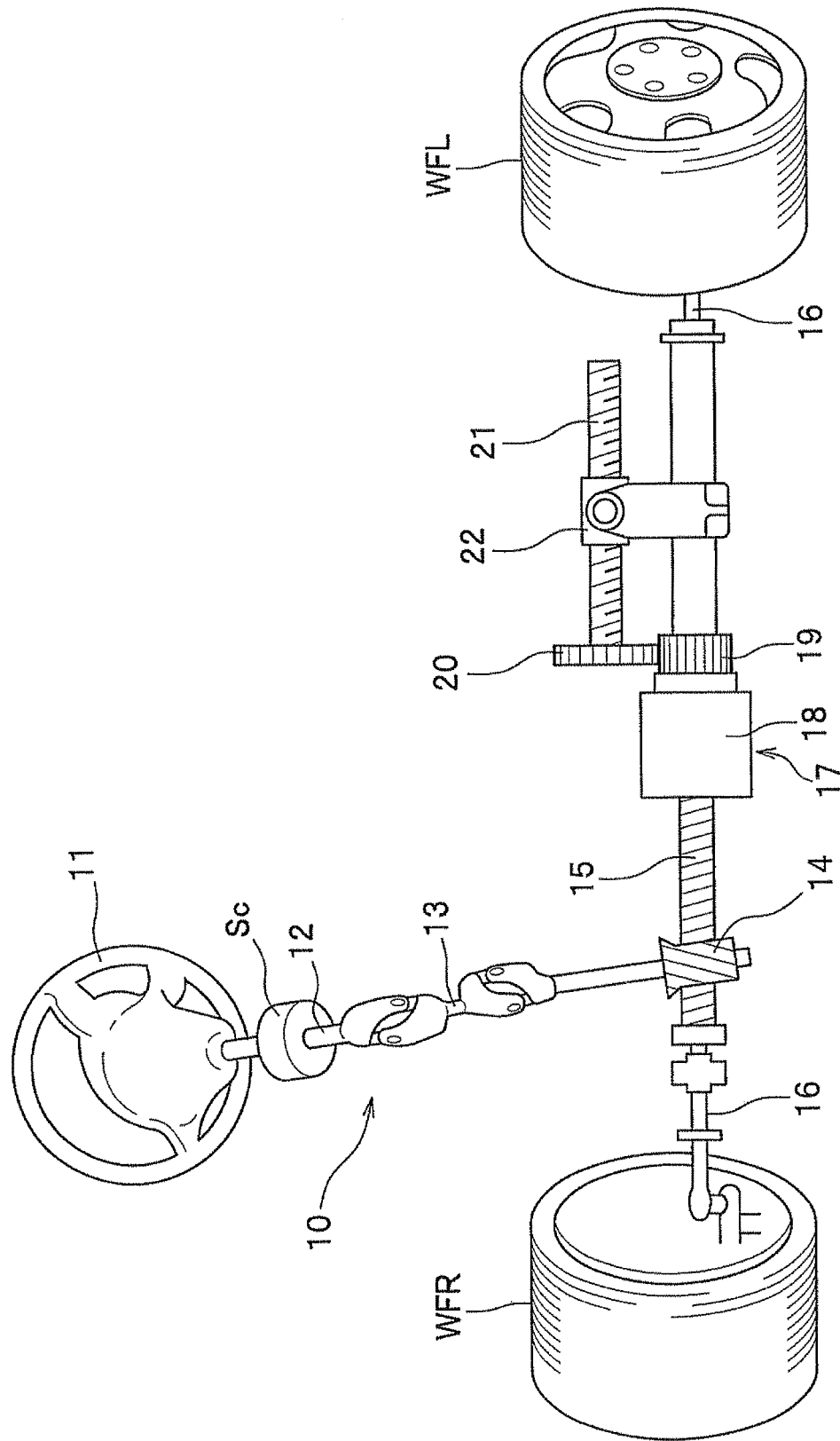
FIG. 2 shows a structure of a steering system of the vehicle.

FIG. 2 shows a structure of a steering system 10 of the vehicle. A rotation of a steering wheel 11 is transmitted to a rack 15 through a steering shaft 12, a connecting shaft 13 and a pinion 14 and a reciprocal movement of the rack 15 is transmitted to the left and right wheels WFL and WFR through left and right tie rods 16. A power steering unit 17 provided in the steering system 10 includes a driving gear 19 provided at an output shaft of a steering actuator 18, a driven gear 20 that engages with the driving gear 19, a screw shaft 21 formed in a body with the driven gear 20 and a nut 22 that engages with the screw shaft 21 and is linked with the rack 15. Accordingly, when the steering actuator 18 is driven, its driving force may be transmitted to the left and right front wheels WFL and WFR through the driving gear 19, the driven gear 20, the screw shaft 21, the nut 22, the rack 15 and the left and right tie rods 16.

The electronic control unit U is connected with a radar unit Sa, a wheel speed sensor Sb, a steering angle sensor Sc, a yaw rate sensor Sd, a transverse acceleration sensor Se, a brake manipulation sensor Sf and a steering torque sensor Sg. The radar unit Sa transmits an electromagnetic wave such as a millimeter wave in a forward direction of the vehicle and that detects, based on its reflected wave, a relative distance between the obstacle and own vehicle, relative speed between the obstacle and own vehicle, relative position between the obstacle and own vehicle and a size of the obstacle. The wheel speed sensor Sb measures speed V of the vehicle by detecting rotational speeds of the front wheels WFL and WFR and the rear wheels WRL and WRR, respectively. The steering angle sensor Sc detects a steering angle δ of the steering wheel 11. The yaw rate sensor Sd detects a yaw rate γ of the vehicle. The transverse acceleration sensor Se detects transverse acceleration YG of the vehicle. The brake manipulation sensor Sf detects manipulation of the brake pedal 1. The steering torque sensor Sg detects steering torque generated when the steering wheel 11 is rotated. It is noted that a laser radar or a front monitoring camera may be adopted instead of the radar unit Sa using the millimeter radar.

Based on signals from the radar unit Sa as well as signals from the respective sensors Sb through Sg, the electronic control unit U controls operations of the electronically controlled negative pressure booster 2, the hydraulic control unit 4, the steering actuator 18 and an alarm 7 such as a buzzer, a lamp, a chime, a speaker and the like. Then, as a computer that executes those controls, the electronic control unit U includes a CPU (Central Processing Unit), a RAM (Random Access Memory), a ROM (Read Only Memory) and others. Programs for implementing processing routines corresponding to those controls are stored in the ROM.

In addition to the relative speed and the relative distance between the obstacle and own vehicle, the radar unit Sa measures a horizontal width w of the obstacle and a transverse deviation of a center of the obstacle with respect to a center line of own vehicle, i.e., a transverse offset distance Ly.

Figure 3:
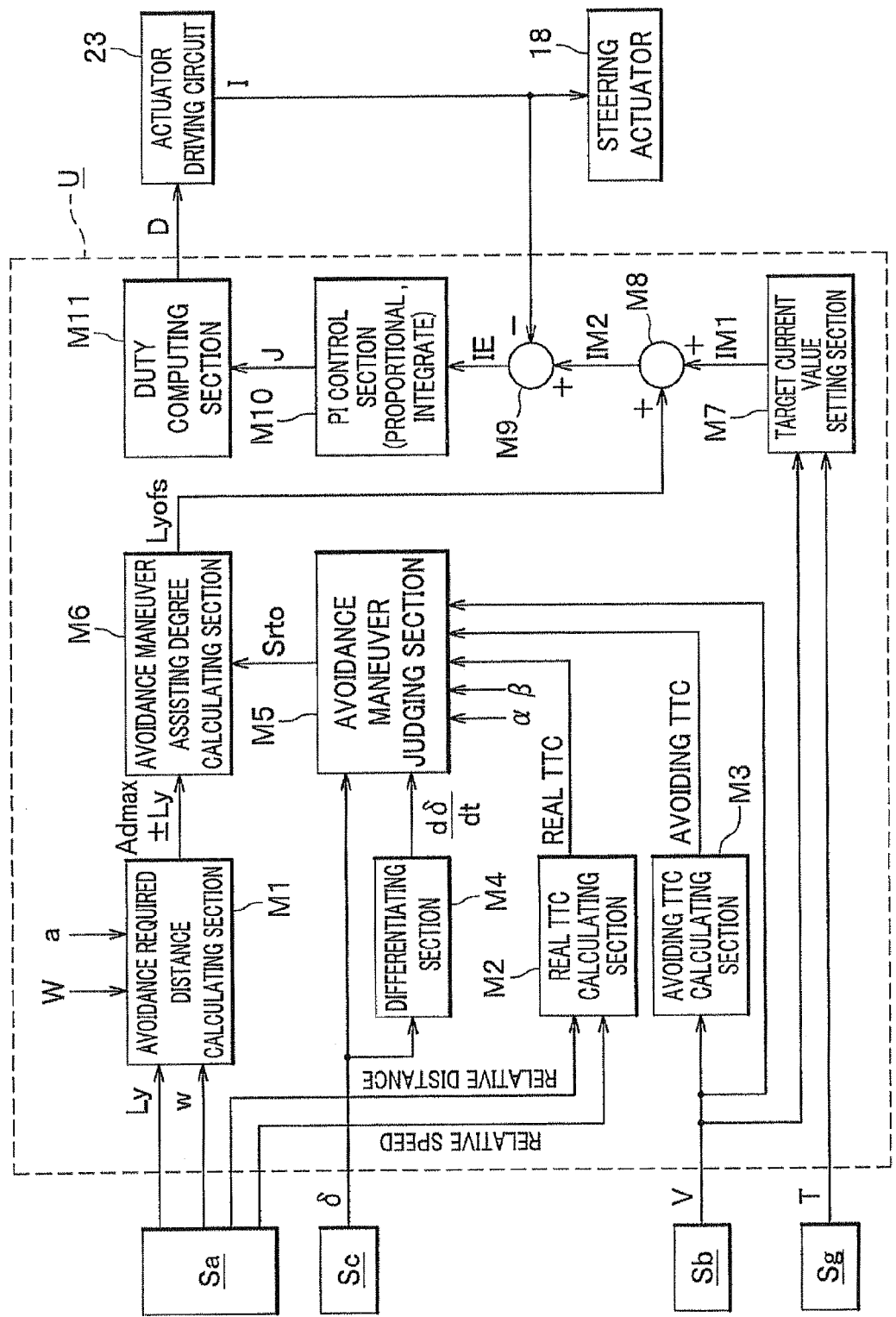
FIG. 3 is a block diagram of an electronic control unit, i.e., control system, of the operation assisting system of the embodiment of the invention.

(2) Structure of Electronic Control Unit:

FIG. 3 is a block diagram of a structure of the electronic control unit, i.e., a control system, of the operation assisting system of the embodiment. The electronic control unit U includes an avoidance required distance calculating section M1, a real TTC calculating section M2 (TTC: time to collision), an avoiding TTC calculating section M3, a differentiating section M4, an avoidance operation determining section M5, an avoidance operation assisting degree calculating section M6, a target current value setting section M7, an adding section M8, another adding section M9, a PI control section M10 and a duty computing section M11. It is noted that among the units and sensors connected to the electronic control unit U, the yaw rate sensor Sd, the transverse acceleration sensor Se and the brake control sensor Sf are not shown in FIG. 3 to explain only what are related with the invention.

Figure 4:
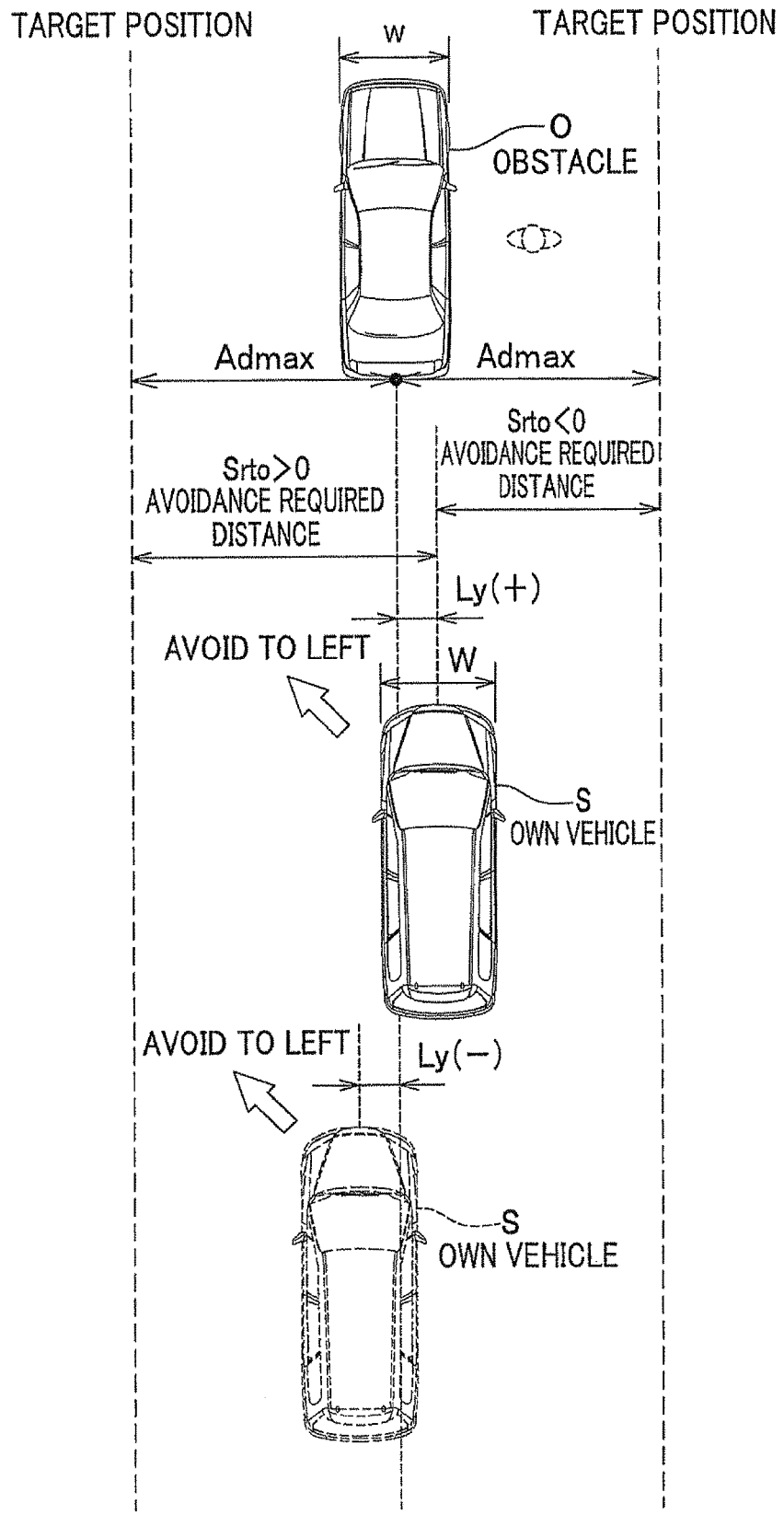
FIG. 4 shows a positional relationship between own vehicle and an obstacle to calculate a degree of assistance to be given to an avoidance operation in avoiding a collision according to the embodiment of the invention.
Figure 5:
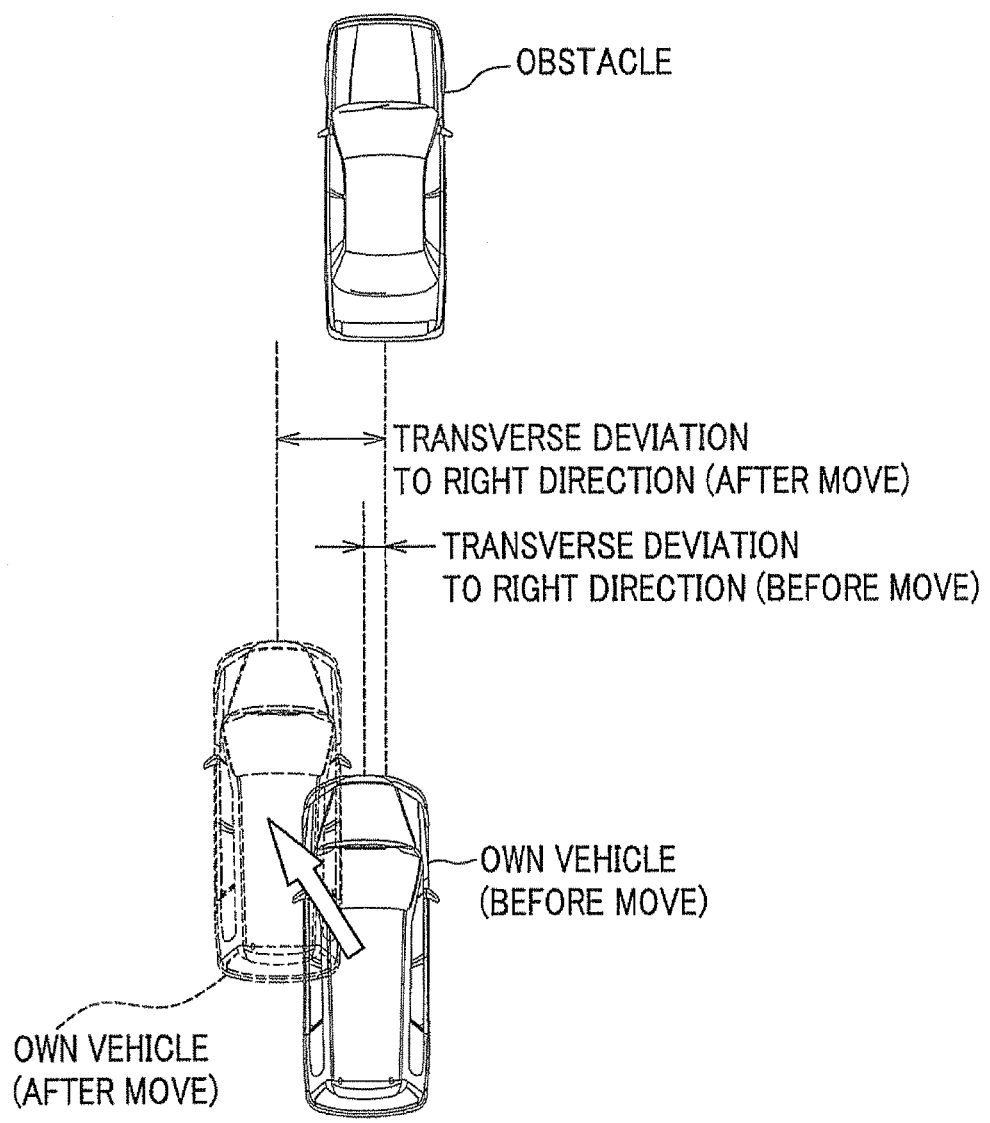
FIG. 5 shows a positional relationship between own vehicle and the obstacle in a prior art assistance given to an avoidance operation.
Figure 6:
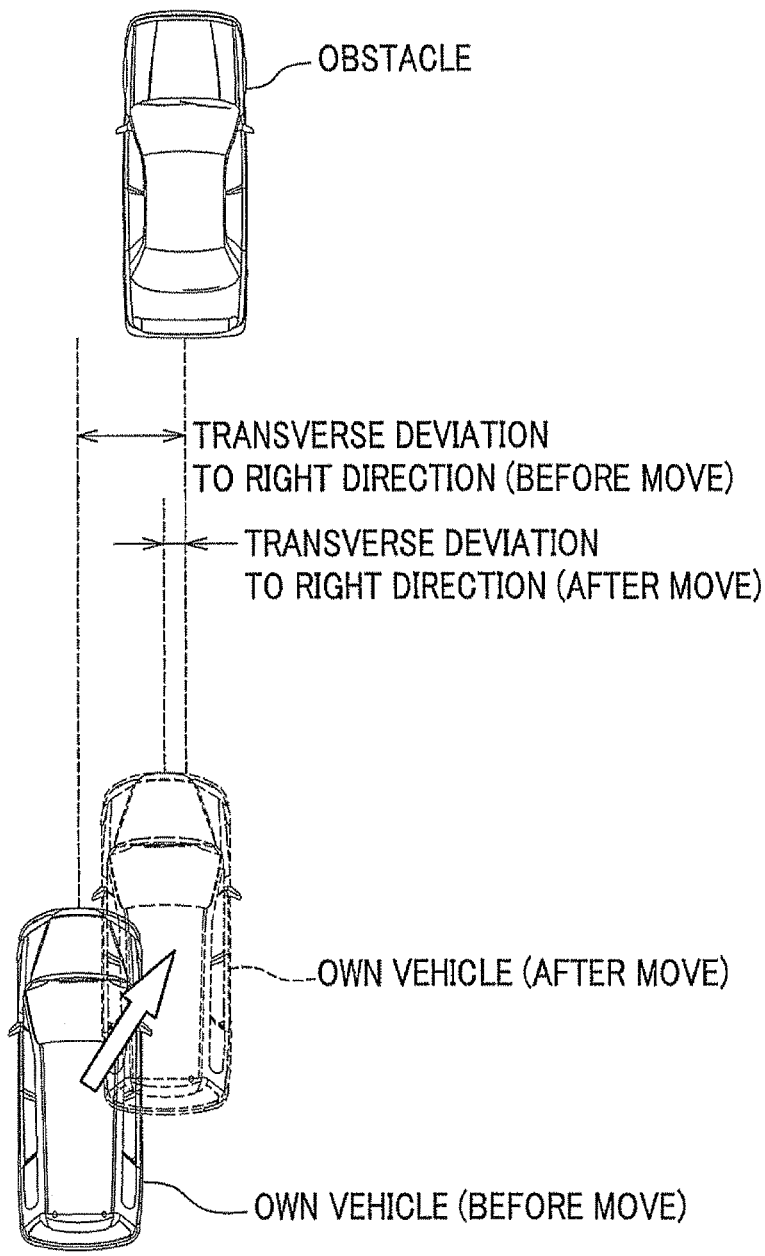
FIG. 6 shows a positional relationship between own vehicle and the obstacle in another prior art assistance given to the avoidance operation.

(3) Operations of Vehicular Manipulation Assisting System:

Next, operations of the vehicular operation assisting system of the present embodiment having the structure as described above will be explained appropriately with reference to FIG. 4. FIG. 4 shows a positional relationship between own vehicle and the obstacle to calculate a degree of assistance to be given to the avoidance operation in avoiding a collision.

When the obstacle O is found ahead of own vehicle S in FIG. 4, the driver tries to avoid the collision with the obstacle O by rotating the steering wheel 11 in one direction of either right or left. The operation for avoiding the collision with the obstacle O will be called as an "avoidance operation", the avoidance in the left direction of own vehicle S as "avoidance to left" and the avoidance in the right direction as "avoidance to right" hereinafter in the present embodiment. Drivers in general have a tendency of rotating the steering wheel 11 insufficiently or excessively in the avoidance operation. The present embodiment provides a smooth avoidance of collision with the obstacle O by assisting the avoidance operation by appropriately controlling the power steering unit 17.

The avoidance required distance calculating section M1 calculates a target avoidance transverse moving distance Admax required for own vehicle S to avoid the obstacle O by Equation 1 by the horizontal width w of the obstacle O detected by the radar unit Sa, the known horizontal width W of own vehicle S and a predetermined margin a, as follows:

$$Ad\max = (w/2)+(W/2)+a \qquad \text{Eq. 1}$$

When the center of the obstacle O resides on the center line of own vehicle S, i.e., when the obstacle O is found directly in front of own vehicle S, own vehicle S can pass through the side of the obstacle O while having a room corresponding to the margin a by moving in the transverse direction by the target avoidance transverse moving distance Admax. "Target positions" in FIG. 4 are positions where own vehicle S would have moved to the both sides of right and left by the target avoidance transverse moving distance Admax from the center of the obstacle O.

The transverse offset Ly with respect to the obstacle O detected by the radar unit Sa is also inputted to the avoidance required distance calculating section M1. The transverse offset Ly is a distance indicating a deviation of the center of the obstacle O with respect to the center line of own vehicle S in the transverse direction. Then, the avoidance required distance calculating section M1 calculates an avoidance required distance from the target avoidance transverse moving distance Admax calculated by Eq. 1 and the transverse offset Ly as Equation 2:

$$\text{avoidance required distance} = Ad\max \pm Ly \qquad \text{Eq. 2}$$

This avoidance required distance is a distance necessary for own vehicle S to avoid the obstacle O when the positional relationship between the obstacle O and own vehicle S is taken into account and is also a distance indicating a deviation between the position of own vehicle S and the target position (see FIG. 4).

In FIG. 4, because own vehicle S indicated by a solid line deviates in the right direction with respect to the obstacle O found ahead of own vehicle S, it is necessary for own vehicle S to move also by the distance of the transverse offset Ly in addition to the target avoidance transverse moving distance Admax in making the avoidance to left and the avoidance required distance at this time is Admax+Ly. However, because own vehicle S indicated by a broken line deviates in the left direction with respect to the obstacle O found ahead thereof, it will do if own vehicle S moves by a distance obtained by subtracting the transverse offset Ly from the target avoidance transverse moving distance Admax when own vehicle S makes the avoidance to left and the avoidance required distance at this time is Admax–Ly.

Note that when own vehicle S makes the avoidance to right, the avoidance required distance changes correspondingly. That is, the avoidance required distance of own vehicle S indicated by the solid line is Admax–Ly and the avoidance required distance of own vehicle S indicted by the broken line is Admax+Ly. The avoidance required distance calculating section M1 is supposed to calculate two values of Admax±Ly as the avoidance required distance so as to be able to deal with the cases whichever the directions to which the driver makes the avoidance. In order to simplify the explanation hereinafter, the case when own vehicle S deviating in the right direction with respect to the obstacle O (i.e., own vehicle S indicated by the solid line) makes the avoidance to left will be explained and own vehicle S is assumed to be traveling the inside of the target positions (see FIG. 4) in the present embodiment.

The real TTC calculating section M2 calculates a real TTC by dividing the relative distance with the obstacle O detected by the radar unit Sa by the relative speed by assuming that longitudinal acceleration of own vehicle S is zero. The real TTC corresponds to an actual time until when own vehicle S collides against the obstacle O.

The avoiding TTC calculating section M3 calculates an avoiding TTC that is a threshold value used by the avoidance operation determining section M5 described later in determining that the avoidance operation of the driver has been made. The avoiding TTC is set within a predetermined range corresponding to the vehicle speed V of own vehicle S calculated from the output of the wheel speed sensor Sb.

The differentiating section M4 calculates steering angular velocity $d\delta/dt$ by temporally differentiating a steering angle $\delta$ of the steering wheel 11 detected by the steering angle sensor Sc.

An avoidance operation determining section M5 determines the avoidance operation made by the driver to avoid the obstacle O on the basis of the steering angle $\delta$ of the steering wheel 11 rotated by the driver and detected by the steering angle sensor Sc and the steering angular velocity $d\delta/dt$ calculated by the differentiating section M4. This judgment is started periodically per micro-time when the real TTC drops below the avoiding TTC.

The judgment of the avoidance operation made by the avoidance operation determining section M5 is performed quantitatively by finding a degree of avoidance operation srto (dimensionless value) from Equation 3, as follows:

$$Srto = \delta \times \alpha + d\delta/dt \times \beta \qquad \text{Eq. 3}$$

$\alpha$ and $\beta$ are parameters for reducing the steering angle $\delta$ and steering angular velocity $d\delta/dt$ into dimensionless values by multiplying respectively with them. $\alpha$ and $\beta$ also play a role of setting the value of srto into a range of –1 through +1 by considering a possible range of the steering angle $\delta$ and the steering angular velocity $d\delta/dt$ in terms of performance of own vehicle S.

The steering angle $\delta$ may take a plus or minus sign depending on a steering direction of the steering wheel 11. The steering angle $\delta$ may be said to be a value indicating a direction of the avoidance operation of the driver when the driver makes the avoidance operation. It is then defined such that the steering angle $\delta > 0$ when the steering wheel 11 is steered to left and the steering angle $\delta < 0$ when steered to right in the present embodiment.

Still more, because drivers tend to quickly rotate the steering wheel 11 in case of emergency in general, the steering angular velocity $d\delta/dt$ may be said to be a value indicating strength of intention of the driver wanting to avoid the obstacle O. Furthermore, because the drivers tend to largely rotate the steering wheel 11 in case of emergency, a magnitude of change of the steering angle may be also said to be a value indicating the strength of intention of the drivers wanting to avoid the obstacle O. Accordingly, the degree of avoidance operation srto may be said to be a value indicating the intention of the driver in which direction and how much the driver wants to avoid the obstacle. When srto>0, it means that the driver intents to avoid to left (by some reason even if own vehicle S is located on the right side of the obstacle O) and the intention to avoid the obstacle O is strongest when srto=1. When srto<0, it means that the driver intents to avoid to right (by some reason even if own vehicle S is located on the left side of the obstacle O) and the intention to avoid the obstacle O is strongest when srto=–1. It is also determined that the driver has no intention of making the avoidance operation when srto=0 and hence no assistance is made by the power steering unit 17 as a result.

A signal of the vehicle speed V is inputted to the avoidance operation determining section M5 from the wheel speed sensor Sb. Thereby, the avoidance operation determining section M5 determines the avoidance operation based on the vehicle speed V of own vehicle S. Specifically, the avoidance operation determining section M5 weights values of δ×α and dδ/dt×β to modify so that weight of the value of δ×α becomes large when the vehicle speed V is large. It is because drivers travel without rotating the steering wheel 11 so much when the vehicle speed V is large, the value of δ becomes small and does not always represent an appropriate value as the degree of avoidance operation srto.

The avoidance operation assisting degree calculating section M6 calculates an avoidance operation assisting degree Lyofs based on the avoidance required distance Admax±Ly calculated by the avoidance required distance calculating section M1 and the degree of avoidance operation srto. When own vehicle S makes the avoidance to left, the avoidance operation assisting degree Lyofs can be found in accordance to Equation 4. When own vehicle S makes the avoidance to right, the avoidance operation assisting degree Lyofs can be found in accordance to Equation 5:

$$\text{Lyofs} = (Ad\text{max} + Ly) \times \text{srto} \quad \text{(avoidance to left)} \qquad \text{Eq. 4}$$

$$\text{Lyofs} = (Ad\text{max} - Ly) \times \text{srto} \quad \text{(avoidance to right)} \qquad \text{Eq. 5}$$

Because the avoidance required distance Admax±Ly shows a positive value in any case, srto>0 and Lyofs>0 from Equation 4 when the avoidance to left is made. When the avoidance to right is made, srto<0 and Lyofs<0 from Equation 5. The avoidance operation assisting degree Lyofs is outputted to the adding section M8 described later as a value indicating a current value necessary for deciding assisting power of the power steering unit 17 corresponding to the avoidance operation.

The calculation of the avoidance operation assisting degree Lyofs is performed periodically in every micro-time by the avoidance operation assisting degree calculating section M6. It is preferable to calculate the avoidance operation assisting degree Lyofs in the avoidances to left and right in advance by using the both Equations 4 and 5 regardless whether the driver will make the avoidance operation to left or right and to adopt the avoidance operation assisting degree Lyofs corresponding to the direction of the avoidance operation when the driver makes the avoidance operation.

It is also preferable to provide upper and lower limit values to the avoidance operation assisting degree Lyofs regardless of the values of the avoidance required distance Admax±Ly and the avoidance maneuvering degree srto. When a distance from the both right and left edges of the obstacle O to the target positions is 1.5 m for example, preferably a range of the value of the avoidance operation assisting degree Lyofs may be limited from −2 m to +2 m. It becomes possible to make an adequate assistance to the avoidance operation without setting an excessive target value even if an abnormal state such as a failure of the radar unit Sa and of the steering angle sensor Sc occurs by limiting as described above.

The target current value setting section M7 generates a signal of an instruction value IM1 for setting a target current value corresponding to the assisting force outputted out of the power steering unit 17 from the steering torque T detected by the steering torque sensor Sg and the vehicle speed V measured by the wheel speed sensor Sb. The target current value setting section M7 generates the signal of the instruction value IM1 by making reference to a table set in advance by experiments and measurements based on the steering torque T and the vehicle speed V. The target current value setting section M7 also performs a damper compensating computation to compensate viscosity of the steering system and an inertia compensating computation to compensate an influence of inertia of the steering system to the instruction value IM1 in setting the target current value.

The adding section M8 adds the avoidance operation assisting degree Lyofs outputted out of the avoidance operation assisting degree calculating section M6 to the instruction value IM1 outputted out of the target current value setting section M7. An instruction value IM2 of a current corresponding to assistance control in which the intention of avoidance of the driver is reflected as compared to a normal assistance control may be generated by adding thus the avoidance operation assisting degree Lyofs to the instruction value IM1A signal.

The adding section M9 performs a feedback control by subtracting only a current value I outputted out of an actuator driving circuit 23 described later from the instruction value IM2 outputted out of the adding section M8. An instruction value IE outputted through the feedback control is inputted to the PI control section M10.

The PI control section M10 generates a signal J by performing P (Proportional) and I (Integral) controls so that the instruction value IE decreases.

A duty computing section M11 generates a duty signal D that is an ON/OFF signal [PWM (Pulse Width Modulation) signal] having a pulse width proportional to a magnitude of the signal J outputted out of the PI control section M10.

The duty signal D generated from the duty computing section M11 of the electronic control unit U is inputted to the actuator driving circuit 23 (not shown in FIG. 2) provided in the steering system 10 (see FIG. 2). The actuator driving circuit 23 has a plurality of switching elements such as a FET bridge circuit for example and generates rectangular-wave voltage by using the duty signal D to drive the steering actuator 18. The current value I necessary for driving the actuator 18 is inputted to the steering actuator 18 and is inputted also to the adding section M9 for making the feedback control.

Accordingly, when the steering actuator 18 is driven so as to correspond to the avoidance operation of the driver in the steering system 10 of the vehicle in FIG. 2, its driving force may be transmitted to the left and right front wheels WFL and WFR via the driving gear 19, the driven gear 20, the screw shaft 21, the nut 22, the rack 15 and the left and right tie rods 16.

(4) Conclusion

The vehicular operation assisting system of the present embodiment brings about the following advantages when it is carried out. That is, when the avoidance operation is required because the obstacle O is found ahead of own vehicle S and when the steering operation is made in a condition when the real TTC decreases below the avoiding TTC, the vehicular operation assisting system of the present embodiment may determine that the driver has an intention to avoid the obstacle O from that operation and may make the assistance immediately to the avoidance operation, differing from Japanese Patent Application Laid-open JP3557907A that has caused a case of not determining as an avoidance operation depending how steering operation is made.

Still more, because the avoidance required distance calculating section M1 periodically finds the avoidance required distance and the avoidance operation determining section M5 determines strength of the intention of the driver wanting to avoid the obstacle and an avoidance direction per predetermined period of time, the vehicular operation assisting system of the embodiment can make the assistance to the avoidance operation conforming to the direction of operation regardless whether the driver rotates the steering wheel 11 to left or right and can make the assistance to the avoidance operation suited to the degree of avoidance operation srto intended by the driver.

Still more, because the avoidance operation determining section M5 determines the avoidance operation of the driver based on the steering angle δ and the steering angular velocity dδ/dt of the steering wheel 11, it is also possible to set so that the intention of the driver is quickly reflected by increasing the parameter β to weight the value of the steering angular velocity dδ/dt and to set so that the avoiding direction is quickly reflected by increasing the parameter α to weight the value of the steering angle. In the setting of the avoiding direction in particular, the avoidance operation assisting degree Lyofs may be set adequately considering the traveling status of the driver by weighting corresponding to the vehicle speed V.

The avoidance operation may be also stabilized because it is possible to set the avoidance operation assisting degree calculating section M6 so as to gradually reduce the avoidance operation assisting degree Lyofs when own vehicle S approaches to the target position as it computes the avoidance required distance Admax±Ly by the horizontal deviation between the target position (see FIG. 4) and the position of own vehicle S.

In case when own vehicle S indicated by the solid line in FIG. 4 makes the avoidance to left, JP3557907A gives no assistance to the avoidance operation until when the transverse offset Ly (corresponds to "transverse deviation" in JP3557907A) is eliminated because the transverse deviation does not increase. However, the vehicular operation assisting system of the invention assists the avoidance operation even under such condition. This is beneficial in that the vehicular operation assisting system of the invention assists even in the beginning of the avoidance in particular. When a person is found on the right side of the obstacle O in FIG. 4, own vehicle S indicated by the solid line cannot naturally make the avoidance to right and cannot but make the avoidance to left even if it has to move by an extra distance by the transverse offset Ly. Under such circumstances, JP3557907A gives no assistance to the avoidance operation because the transverse offset Ly (transverse deviation) reduces in the beginning of the avoidance operation. However, the invention can advantageously assist the avoidance operation from the moment when the driver starts to rotate the steering wheel 11 to left as the avoidance operation.

It is noted that although the mode described above is the best mode for carrying out the invention, it is not intended to limit the invention to such mode. Accordingly, the mode for carrying out the invention may be variously modified within a scope in which the subject matter of the invention is not changed.

What is claimed is:

1. A vehicular operation assisting system for assisting a driver in making an avoidance operation of a vehicle to avoid an obstacle, comprising:
    a processor, including:
    an obstacle detecting section for detecting the obstacle ahead of the vehicle;
    an avoidance required distance calculating section for periodically calculating a distance required to avoid the detected obstacle;
    an actuator which applies an assist force to a steering wheel;
    a steering angle detecting section for detecting a steering angle of the steering wheel;
    a steering angular velocity calculating section for calculating a steering angular velocity of the steering wheel based on the steering angle;
    an avoidance operation determining section for:
        periodically calculating an avoidance operation amount based on the steering angle and the steering angular velocity of a steering operation made by the driver using: srto=δ×α+dδ/dt×β, where the srto represents the avoidance operation amount and ranges from −1 to +1, and wherein δ is the steering angle, dδ/dt is the steering angular velocity, and α and 62 are coefficients, and
        determining an avoidance operation based on the avoidance operation amount calculated by srto=δ×α+dδ/dt×β regardless of a positional relationship of the vehicle and the obstacle detected by the obstacle detecting section in a right direction and a left direction; and
    an avoidance operation assisting degree calculating section for periodically calculating an avoidance operation assisting degree based on the calculated distance and the determined avoidance operation;
    wherein the avoidance operation determining section is configured to increase a value of (δ×α) as the vehicle speed increases, and drive the actuator for applying the assist force to the steering wheel based on a value obtained by adding the calculated avoidance operation assisting degree to a target value which is set based on a steering torque and the vehicle speed.

2. The vehicular operation assisting system according to claim 1,
    wherein the obstacle detecting section measures a horizontal width of the detected obstacle and a transverse offset distance between the detected obstacle and the vehicle upon detecting the obstacle ahead of the vehicle; and
    the avoidance required distance calculating section calculates a target avoidance transverse moving distance based on the horizontal width of the detected obstacle and a horizontal width of the vehicle and calculates the distance required to avoid the detected obstacle corresponding to a direction of the avoidance operation made by the driver based on the target avoidance transverse moving distance and the offset distance.

3. The vehicular operation assisting system according to claim 1, wherein the avoidance operation assisting degree calculating section sets upper and lower limit values regardless of the distance required to avoid the detected obstacle and the degree of avoidance operation.

4. The vehicular operation assisting system according to claim 1, wherein the avoidance operation determining section comprises a weight setting section for weighting the values of the steering angle and the steering angular velocity, and the avoidance operation determining section is configured to:
    define a value of the steering angle outputted as a result of steering in one direction among left and right directions as positive and a value of the steering angle outputted as a result of steering in another direction as negative;
    determine that the driver wants to steer in one direction when a sum of the steering angle and the steering angular velocity weighted by the weight setting section is a positive value;
    determine that the driver wants to steer in the other direction when the sum of the steering angle and the steering angular velocity weighted by the weight setting section is a negative value; and determine that the driver has no intention to make the avoidance operation when the sum of the steering angle and the steering angular velocity weighted by the weight setting section is 0.

5. The vehicular operation assisting system according to claim 4, wherein the weight setting section increases the weight of the value of the steering angle as the vehicle speed increases.

6. A vehicular operation assisting method of assisting a driver in making an avoidance operation of a vehicle to avoid an obstacle, comprising:
    detecting, by a processor, the obstacle ahead of the vehicle;
    periodically calculating a distance required to avoid the detected obstacle;
    applying an assist force to a steering wheel via an actuator;
    detecting a steering angle of the steering wheel;
    calculating a steering angular velocity of the steering wheel based on the steering angle;
    periodically calculating an avoidance operation amount based on the steering angle and the steering angular velocity of a steering operation made by the driver using: srto=$\delta \times \alpha \times d\delta/dt \times \beta$, where the srto represents the avoidance operation amount and ranges from −1 to +1, and wherein $\delta$ is the steering angle, $d\delta/dt$ is the steering angular velocity, and $\alpha$ and $\beta$ are coefficients;
    determining an avoidance operation based on the avoidance operation amount calculated by srto=$\delta \times \alpha + d\delta/dt \times \beta$ regardless of a positional relationship of the vehicle and the obstacle detected by the obstacle detecting section in a right direction and a left direction; and
    periodically calculating an avoidance operation assisting degree based on the calculated distance and the determined avoidance operation;
    wherein a value of ($\delta \times \alpha$) is configured to increase as the vehicle speed increases, and the actuator is driven to apply the assist force to the steering wheel based on a value obtained by adding the calculated avoidance operation assisting degree to a target value which is set based on a steering torque and the vehicle speed.

7. The vehicular operation assisting method according to claim 6, wherein detecting the obstacle includes measuring a horizontal width of the detected obstacle and a transverse offset distance between the detected obstacle and the vehicle upon detecting the obstacle ahead of the vehicle; and
    calculating the distance required to avoid the detected obstacle includes calculating a target avoidance transverse moving distance based on the horizontal width of the detected obstacle and a horizontal width of the vehicle and calculating the distance required to avoid the detected obstacle corresponding to a direction of the avoidance operation made by the driver based on the target avoidance transverse moving distance and the offset distance.

8. The vehicular operation assisting method according to claim 7, wherein calculating the avoidance operation assisting degree includes setting upper and lower limit values regardless of the distance required to avoid the detected obstacle and the degree of avoidance operation.

9. The vehicular operation assisting method according to claim 6, wherein determining the avoidance operation includes:
    setting weight to the values of the steering angle and the steering angular velocity;
    defining a value of the steering angle outputted as a result of steering in one direction among left and right directions as positive and a value of the steering angle outputted as a result of steering in another direction as negative;
    determining that the driver wants to steer in one direction when a sum of the steering angle and the steering angular velocity weighted in the weight setting step is a positive value;
    determining that the driver wants to steer in the other direction when the sum of the steering angle and the steering angular velocity weighted in the weight setting step is a negative value; and
    determining that the driver has no intention to make the avoidance operation when the sum of the steering angle and the steering angular velocity weighted in the weight setting step is 0.

* * * * *